United States Patent

Fauteux et al.

Patent Number: 5,141,622
Date of Patent: Aug. 25, 1992

[54] ELECTROCHROMIC PRINTING MEDIUM

[75] Inventors: Denis G. Fauteux, Acton, Mass.; Dale R. Shackle, Morgan Hill, Calif.; Jefferis R. Canan, Springfield, Ohio

[73] Assignee: The Mead Corporation, Dayton, Ohio

[21] Appl. No.: 784,363

[22] Filed: Oct. 29, 1991

[51] Int. Cl.⁵ ............................................. G01D 15/06
[52] U.S. Cl. ..................................................... 205/55
[58] Field of Search ................................... 205/52, 55

[56] References Cited

U.S. PATENT DOCUMENTS 4,374,001  2/1983  Bernier ................................. 205/55

Primary Examiner—T. M. Tufariello
Attorney, Agent, or Firm—Thompson, Hine and Flory

[57] ABSTRACT

An electrochromic printing medium comprising a solid support having an electrochromic composition coated thereon comprising an electrolyte matrix, a radiation-inert ionically conducting liquid, and an ionizable alkali or ammonium slat; a method for preparing such medium; and a method for forming an image employing such electrochromic printing medium.

20 Claims, No Drawings

ELECTROCHROMIC PRINTING MEDIUM

BACKGROUND OF THE INVENTION

1. Field of the Invention

The present invention relates to an electrochromic printing medium for use in an electrochromic printing process and a method for making the same.

2. Description of the Prior Art

Electrochromic printing is well known in the art. Types of electrochromic printing materials previously known involve coating a leuco dye halide compound onto a substrate. The substrate is then wetted with water just prior to printing so that the current pulse is passed to the substrate whereby the halide can provide an electro oxidation of the leuco dye into a colored dye.

The methods for electrochromic recording taught in the prior art have many variations. However, basically, one or both sides of a sheet of paper is coated or treated with a coating formulation containing at least one colorless color-forming compound (leuco) compound. Electrical current is then selectively applied to the coated side of the paper by some means, for example, a stylus or a printing head to which a voltage can be applied. The application of the voltage causes an electrochromic reaction, involving the leuco compound to produce a visible image corresponding to the design traced by the stylus or by the printing head.

The following items appear to constitute the most relevant prior art with regard to the instant invention.

J. E. Kassner, "The Development of Oxidation-Sensitive Dyes in Support of IBM's Molecular Matrix Technology", J. Imaging Technology, 12(6), 325 (1986) describes a two-stage process in which bromine is electrolytically generated via the oxidation of a bromide compound, followed by a reaction between the bromine and a leuco dye.

U.S. Pat. Nos. 4,374,001 to Bernier and 4,439,280, 4,443,302, 4,309,255 and 4,478,687 to Gender et al. describe various types of leuco dyes in such aqueous/halide-containing electrochromic coating compositions.

The previous electrochromic mediums, however, suffer from several deficiencies. The mediums provide low image formation speed and poor image stability, which may be partly due to the aqueous type coating compositions which includes a reversible oxidation/reduction reaction of the leuco dye. In an effort to reduce the voltage required to form an image, an aqueous coating is employed which allows for such voltage reduction. However, the aqueous coating causes an undesirable curl and/or cockle in the paper substrate and requires drying of the paper substrate. In addition, problems of anode corrosion also necessitate the use of expensive electrode materials.

Thus, it would be desirable to have an electrochromic medium which can use low voltages to form an image, maintains a stable image, and employs a non-aqueous electrolyte. The present invention provides such a material and a process for making the same.

SUMMARY OF THE INVENTION

A principal object of the present invention is to provide an improved electrochromic printing medium which upon printing exhibits improved resistance to fading of the formed image, uses low voltage for image formation, and is substantially resistant to curl and cockle during and after image formation.

Another object of the present invention is to provide a method for preparing a non-aqueous electrochromic printing medium for use in an electronic printing process such that the electromotive force requirements for printing are on the order of less than ±10 volts and preferably less than ±5 volts. Such voltage amounts can be produced and controlled through the use of a power source, and an integrating network.

A further object of the present invention is to provide a method for forming colored images employing the above electronic printing medium.

Accordingly, one embodiment of the present invention is directed to an electrochromic printing medium comprising a support, having coated thereon a solid electrolyte matrix, said solid electrolyte matrix comprising at least in part one or more mono and/or copolymers derived from one or more monomers containing at least one heteratom, notably oxygen or nitrogen liable to form donor-acceptor type bonds with alkali metal or ammonium cations, a radiation inert ionically conducting liquid, and an ionizable alkali metal or ammonium salt, and a leuco-dye.

In a particularly preferred embodiment the electrolyte and the leuco dye are applied to the support as separate layers wherein the leuco dye layer overcoats the eletrolyte layer.

Another embodiment of the present invention is a method for forming an electrochromic printing medium comprising applying to the surface of a support (1) an electrolye, said electrolye comprising a radiation polymerizable or crosslinkable compound, a radiation inert ionically conducting liquid, and an ionizable alkali metal or ammonium salt; and (2) a leuco dye; and subjecting said medium to actinic radiation to thereby polymerize or crosslink said radiation polymerizable or crosslinkable compound.

Yet another embodiment of the present invention is a method for electrochromic printing comprising applying a controlled voltage to an electrochromic medium, said medium including a solid electrolyte matrix and a leuco dye such that the matrix conducts sufficient electrical current to cause the electrochromic compound to undergo a chemical change and exhibit a colored image.

The electrochromic printing medium of the present invention containing the electrolyte and the leuco dye are prepared by coating non-aqueous mixtures containing the electrolye and the leuco dye, on a suitable substrate which can be a conducting layer such as aluminized mylar film, or a non-conductive layer such as a plastic film or plain paper. The viscosity of the mixture should be high enough to allow blade coating on the substrate. If the substrate is plain paper, it may be necessary to apply a polymeric barrier film directly onto the paper before overcoating the substrate with the leuco dye-containing polymeric film coating since some papers contain additives which, when in direct contact with the leuco dye, can cause undesired color development. In a preferred electrochromic printing medium, the electrolyte is the barrier film and the leuco dye is applied as an overcoat on the electrolyte. In some cases, it may be desirable to crosslink the polymeric film to improve the stability of the electrolyte. However, crosslinking by means of ionizing radiation such as UV or electron beams should be performed prior to application of the dye overcoat since such crosslinking may prematurely cause unwanted color development.

Certain additives such as $TiO_2$ may be incorporated into the film to impart desired background color properties or to improve conductivity. These additives should be screened to prevent the introduction of unwanted electrochemical or chemical activity.

Image formation is achieved in accordance with the present application by applying a suitable electrical voltage to the electrolyte/substrate in an otherwise conventional manner. Specific single or multiple color images are created by tracing out the image with a stylus or printing head which applies the electrical potential. The magnitude of the applied voltage is dependent upon the ionic conductivity of the electrolyte and the nature of the substrate. While images may be formed at relatively high voltages, e.g., 100 volts, the preferred range is about ±10 volts and most preferably about ±5 volts.

Where the substrate is a conductive film or foil, the potential is applied directly between the stylus and the substrate. Where the substrate is plain paper or other non-conducting material, it may be necessary to position the substrate firmly over a metallic conductor. It is, however, possible and even preferable to employ a single print head having both the positive and negative electrodes incorporated directly in the printing head which eliminates the need for a conductive substrate altogether.

Alternatively, the image formation can be achieved by an indirect electrochromic method wherein an organic compound precursor such as benzyl benzoate is added to the coating formulation. The precursor, under cathodic potential, generates an acid which, because of its proximity to the leuco dye, will develop the image. The precursor may be a leuco dye compound containing a substituent which, when cleaved from the leuco dye precursor via electrochemical reaction, forms the exact stoichiometric amount of acid necessary to develop the dye. Such reaction involving the formation of sulfinic acid is illustrated in equation (I).

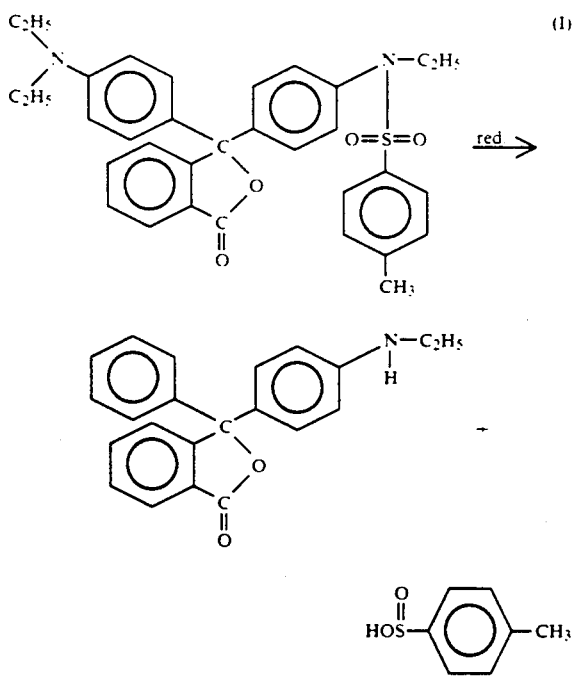

The aromatic ring supporting the electrochemically generated acid can be substituted with a variety of substituents, e.g., methyl, to control mobility of the compound in the coating formulation and thereby provide a better image definition without feathering or distortion.

It has further been found that certain solid electrolyte films can be removed without tearing from the substrate. Thus, it is possible to transfer the solid electrolyte film after forming the image to another substrate such as plain paper. It is also possible to overlay, with proper registration, additional solid electrolyte films with images formed using leuco dyes which yield different colors. Thus, it is possible to form a multi-color imaging system which relies upon electrochromic imaging and lamination of the multi-layers. Of course, the single-color imaging system without a transfer of the imaging layer is the simplest version of this imaging system.

Color images can also be produced by using a multi-color simple leuco-dye compound such as 2,3,5,7-tetrapic(3,5-di-tert-butyl-4-hydroxyphenyl)thieno[3,2-b]tiophene (THPT2). In the case of THPT2, the leuco-dye is oxidized to one of the three color-stable oxidation stages, each of which provides for a different color. In this case, there is no need for transfer and lamination to provide a multi-color image since control of the voltage will provide the multiple color image. This is possible because of (1) good conductivity of the electrolyte, and (2) electrochemical stability domain of the eletrolyte is larger than the stability domain of the water base electrolyte, i.e. the leuco dye is oxidized, not the water.

Electrochromic materials in accordance with the invention are believed to be superior to the prior art systems since they do not employ an aqueous electrolyte which eliminates the problem of electrode dissolution/erosion so that inexpensive electrodes can be employed. Furthermore, the leuco dye may be entrapped within the polymeric electrolyte and, thus, its stability against oxidation is improved. From an electrochemical viewpoint, this method is simpler, since it is not a two-stage process. Simplification of the copier also results since it is not required to use water in the process. Image uniformity should be superior, since dye dilution by excessive water application should no longer be necessary. Image stability should also be superior.

In general, electrochromic imaging processes have advantages over other types of printing and copying systems, since they do not require the use of photographic exposure or subsequent development processes. The imaging process is dry. Both plain and coated paper can be employed and high resolution appears readily achievable with moderate cost. Current microprocessor technology exists which simplifies the printer head addressing scheme. Also, ionic-conducting polymer technology has been developed for the battery field which can immediately be transferred to this application.

DETAILED DESCRIPTION OF THE INVENTION

In one embodiment, the electrochromic printing material of the present invention may comprise an interpenetrating network of two co-continuous phases. One of the phases is a solid electrolyte matrix which provides the support for the free-standing solid electrolyte. The other is an ionic conducting phase which comprises an alkali metal or ammonium salt and a salt-complexing liquid polymer. Solid electrolytes are employed since they afford protection from atmospheric oxidation and, in addition, control of the electrolyte composition is quite easy. The ionic conducting phase provides continuous paths of high ionic conductivity in all directions throughout the solid electrolyte. Such solid electrolytes were developed previously for use in solid state batteries. For example, Bauer et al., U.S. Pat. No. 4,654,279, describes a cell in which the electrolyte is a two-phase interpenetrating network of a mechanically supporting phase of a continuous network of a crosslinked polymer and an interpenetrating conducting liquid polymer phase comprising an alkali metal salt of a complexing liquid polymer which provides continuous paths of high conductivity throughout the matrix. In one embodiment, a liquid complex of a lithium salt and polyethylene oxide is supported by an epoxy, a polymethacrylate, or a polyacrylonitrile matrix. The network is formed by preparing a solution of the metal salt, the salt-complexing liquid polymer, and the monomer for the crosslinked supporting phase in a polar solvent. The solvent is evaporated to form a dry layer of a mixture of the remaining materials. The dry layer is then cured.

Le Mehaute et al., U.S. Pat. No. 4,556,614 discloses a solid electrolyte for an electrochemical cell in which a salt complexing polymer is mixed with a miscible and crosslinkable second polymer. The function of the second polymer is to maintain the complexing polymer in a more highly conductive amorphous state. This is accomplished by forming a solution of the two polymers and an ionizable salt in a solvent, evaporating the solvent, and crosslinking the second polymer, e.g., by radiation.

Andre et al., U.S. Pat. No. 4,357,601, generally relates to crosslinked polymeric electrolytes containing heteroatoms which are also useful herein. The compositions described in the patent are chemically crosslinked, for example, through the reaction of a polyol and a polyisocyanate.

A variety of ion-conducting polymeric electrolytes can be employed in the present invention such as poly(ethylene)oxide (PEO), poly(propylene)oxide, poly(glycidylmethyl ether), poly(N-methyl aziridine), poly(glycidyl-methoxy-ethoxy-ethyl ether) and poly(ethylene)imine as described in the above patents, particularly, U.S. Patent Nos. 4,303,748 to Armand and 4,830,939 to Lee et al.

Polyethylenically unsaturated monomeric or prepolymeric materials most preferred in forming the solid electrolytes useful herein are the compounds described in U.S. Pat. No. 4,830,939 to Lee, et al. as having at least one, and more preferably, a plurality, of heteroatoms (particularly oxygen and/or nitrogen atoms) capable of forming donor acceptor bonds with an alkali metal or ammonium cation and which are terminated by radiation polymerizable moieties. These compounds yield a conductive supportive matrix. More specifically they are preferably low molecular weight oligomers of the formulas (I)-(III) below

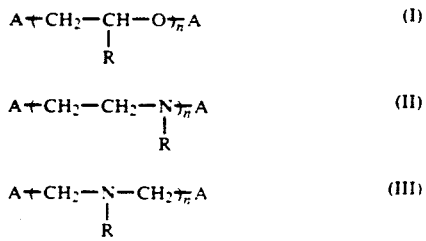

where n is about 3 to 50 and R is hydrogen or a $C_1$-$C_3$ alkyl group, which are terminated by ethylenically unsaturated moieties or glycidyl moieties represented by A.

A particularly useful group of radiation polymerizable compounds are obtained by reacting a polyethylene glycol with acrylic or methacrylic acid. Also useful in the present invention are radiation curable materials such as acrylated epoxies, e.g., Bisphenol A epoxy diacrylate, polyester acrylates, an acrylated functionalized polyurethane such as Uvithan ZL-1178 available from Morton Thiokol Chemical Company or copolymers of glycidyl ethers and acrylates.

In selecting these monomers, monomers are selected which do not adversely react with the electrochromic printing heads to cause corrosion of the head. For example, halogenated monomers such as vinyl chloride are preferably avoided.

Preferably, the polyethylenically unsaturated compounds have a molecular weight of about 200 to 2,000 and more preferably 200 to 800. Still more preferably they are liquids at temperatures less than 30.C. Examples of such materials include polyethylene glycol-300 diacrylate (average PEO molecular weight about 300), polyethylene glycol-480 diacrylate (average PEO molecular weight about 480) and the corresponding methacrylates.

It may be desirable to include a radiation curable comonomer in the composition to reduce the glass transition temperature and improve conductivity of the polymer. Any suitable monoacrylate such as tetrahydrofurfuryl acrylate, tetrahydrofurfuryl methacrylate, methoxypolyethylene glycol monomethacrylate, 2-ethoxyethyl acrylate, 2-methoxyethyl acrylate. Monoacrylates may be used in an amount of about 5 to 75% by weight based on the total amount of radiation polymerizable material. Triacrylates such as trimethylolpropane triacrylate (TMPTA), trimethylolpropane ethoxylated triacrylate (TMPEOTA) or trimethylolpropane propoxy triacrylate may be used to introduce crosslinking of the polymer. The triacrylates are used in amounts of about 2 to 30% by weight based on the total amount of radiation polymerizable material. The supportive matrix may be formed in whole or in part from the above compounds.

The electrolyte of this invention contains about 20% to 55% by weight and preferably 25 to 40% by weight of the radiation polymerizable, polyethylenically unsaturated compound, and about 45% to 80% by weight of a radiation-inert liquid based on the total weight of the radiation polymerizable material and the weight of the radiation-inert ionically conducting liquid. The exact amount of the compound and the inert liquid should be adjusted to provide the optimum combination of strength and conductivity for the particular application. However, if the mixture contains greater than about 55% polyethylenically unsaturated material, the electrolyte may exhibit poor conductivity.

The radiation-inert liquid which forms the ionically conductive liquid interpenetrating phase can be any low volatile aprotic polar compound or a compound having heteroatoms capable of forming donor-acceptor bonds with alkali metal or ammonium cations. Preferably, these compounds are characterized by a boiling point greater than 80° C. Representative examples are propylene carbonate, ethylene carborate, gamma-butyrolactone, 1,3-dioxolane, and 2-methyltetrahydrofuran. Less polar compounds having heteroatoms capable of bonding alkali metal cations may also be useful. Ethylene carbonate which has very good condutivity and low vapor pressure is a preferred example. Acetonitrile and glymes such as tetraglyme, hexaglyme, and heptaglyme are also desirable compounds.

Ionizable salts useful in this invention include those salts conventionally used in solid state electrochemical cells. Representative examples are sodium, lithium, potassium, cesium, and ammonium salts of less mobile anions of weak bases having a large anionic radius. Examples may be selected from the group consisting of $I^-$, $Br^-$, $SCN^-$, $ClO_4^-$, $BF_4^-$, $PF_6^-$, $AsF_6^-$, $CF_3COO^-$, $CF_3SO_3^-$, etc. Specific examples are $LiClO_4$, $NaClO_4$, $LiF_3CSO_3$, and $LiBF_4$, and $N(C_4H_9)_4BF_4$. It is generally desirable to minimize the hydroscopic nature of the polymeric film and, therefore, lithium-containing salts are the least preferred.

The salt may be used up to an amount which does not exceed its solubility limit in the electrolyte. The amount will therefore vary with the nature of the polyethylenically unsaturated material and the inert liquid solvent. As a general rule, the maximum amount of salt within its solubility limit should be used to maximize the ionic conductivity of the electrolyte. In most applications about 10 to 60 parts salt is used per 100 parts of inert liquid phase.

A wide spectrum of electrochromic dyes are suitable for use in the present imaging system such as: phthalides, for example, crystal violet lactone, Malachite green lactone: fluorans, for example, 3-diethylamino-5,7-dimethylfluoran: and indolinobenzospiropyrans, for example, 1,3,3-trimethyl-6'-chloro-8'-methoxyindolinobenzospiropyran. Other electrochemical dyes are monomers or oligomers which are of low molecular weight and which are developed when a small voltage is applied to provide a colored polymer which is of high molecular weight and extremely low mobility. This characteristic assures that the image formed remains intact even after long periods of storage. Another desirable attribute of these materials is high image resolution. Representative examples of such monomers or oligomers which are readily electrochemically polymerized to form stable, colored polymers include aniline, pyrrole, methylpyrrole, and analogues of such compounds. Also utilized as colorless precursors for electrochromic recording, either alone or in admixture with the compounds indicated above, are substances known as redox indicators. The redox indicator which becomes colored or discolored in situ in the electrochromic recording process also is generally a leuco body. Among the types of compounds which are applicable as redox indicators are phenothiazines, for example, leuco methylene blue and benxoyl leuco methylene blue. Other specific indicators are Leucoethyl Nile Blue, Leucomethyl Capryl Blue and Leucosafranine T. Typical of the many such electrochromic recording systems taught in the prior art are those described in U.S. Pat. Nos. 3,726,769, 3,871,972, 3,864,684, 4,133,933, and U.S. Pat. No. Re. 29,427. Other useful dyes include acylphenothiazines and acylphenoxazines; imidazophenoxazines; benzo[a]-phenoxazines; and mono and bis substituted phthalazinones, phthalimidines, pyridopyridazenones and pyrrolopyridinones which are the subject of U.S. Pat. No. 4,561,001; 4,549,192; 4,570,171; and 4,539,579, respectively and assigned to Hilton-Davis. A preferred dye is Copikem II, an ortho-sulfo benzoyl leuco methylene blue manufactured by Hilton-Davis.

| | |
|---|---|
| CVL | available from Hodagaya |
| DCF Green | available from Hodagaya |
| Reakt Red 448 | available from BASF |
| Copikem IV | available from Hilton Davis |
| Copikem XIV | available from Hilton Davis |
| Pergascript Organe 1-5R | available from Ciba Geigy |
| Pergascript Blue 1-2G | available from Ciba Geigy |
| Copikem 34 | available from Hilton Davis |
| Black 15 | available from Hilton Davis |
| Copikem Magenta | available from Hilton Davis |
| Copikem XX | available from Hilton Davis |
| Copikem VI | available from Hilton Davis |
| S-5100 | available from Hilton Davis |
| Copikem II (BLMB) | available from Hilton Davis |
| PSD-102 | available from Nippon Soda |
| PSD-288 | available from Nippon Soda |
| PSD-290 | available from Nippon Soda |
| PSD-184 | available from Nippon Soda |
| Orange B-2 | available from Hodagaya |
| Vermillion B-2 | available from Hodagaya |
| H-83 red | available from Hodagaya |
| 38 DCF Green | available from Hodagaya |
| TH 102 | available from Hodagaya |
| Black 400 | available from Yamada |
| Green 100 | available from Yamada |
| Red 500 | available from Yamada |
| S-205 black | available from Yamada |
| Black NIR | available from Yamada |
| Orange 100 | available from Yamada |
| Black 100 | available from Yamada |

Obviously, the dye selection should be made based upon the desired imaging color, cost, toxicology, solvent solubility, inherent background color, color intensity, etc.

The electrochromic printing media of the present invention can be prepared in a number of ways. For example, the electrolyte composition may be dispersed along with the dye in an appropriate solvent, coated on a support and dried. In accordance with a preferred embodiment of the invention, the polymerizable electrolyte composition is coated on at least one side of the substrate and cured thermally or by exposure to radiation. If the substrate is highly porous such as paper, the electrolyte composition may be impregnated throughout the support. Typically, the electrolyte composition is applied at a thickness of about 5 to 25 microns. The electrolyte coated substrate is then overcoated on one side with a solution of the appropriate dye in a solvent such as tetrahydrofuran (THF) so that the dye is concentrated at the surface of substrate. The dye is applied at a coat weight which is high enough to provide sufficient color density and yet low enough to be economically practical. Typically the dye solution is applied to the substrate to provide a coat weight of the dye of about 0.1 to 0.2 $mg/cm^2$, depending on the dye employed. Various conventional coating techniques for applying the compositions to the substrate may be used including a Meyer rod, blade coaters, roll coaters, etc. In addition, the composition may be extrusion coated onto the surface of the substrate. The resulting composition should be tough and resistant to abrasion.

Suitable substrates useful in the present invention include both conductive and non-conductive substrates. Examples of conductive substrates include aluminized mylar film. Examples of non-conductive substrates include paper, plastic film, paper board, etc.

Electrochromic printing heads which can be used in conjunction with the present invention include those shown in U.S. Pat. Nos. 4,434,432 to Dailey et al., 4,206,017 to Robillard 4,860,277 to Wisseroth et al., 4,539,576 to Chance et al., 4,453,171 to Bernier et al., 4,264,693 to Gardineer et al., and 4,145,697 to Ballinger.

The invention will be illustrated in more detail by the following nonlimiting examples.

First and second coating formulations are prepared by mixing together the listed constituents as follows:

|  | Formulation 1 | | Formulation 2 | |
|---|---|---|---|---|
| EC[1] | 85.5 g | 34.3% | 76.0 g | 30.5% |
| WSR-205[2] | 4.5 g | 1.8% | 4.0 g | 1.6% |
| PEG[3] | 90.0 g | 36.1% | 80.0 g | 32.1% |
| PEGDA[4] | 20.0 g | 8.0% | 26.7 g | 10.7% |
| TMPTA[5] | 40.0 g | 16.0% | 53.3 g | 21.4% |
| TBuNBF$_4$[6] | 9.12 g | 3.7% | 9.12 g | 3.7% |
| Total | 249.12 g | | 249.12 g | |
| Darocure[7] | 3.5 g | | 3.5 g | |

The resulting solutions are transparent and homogeneous.

(1) ethylene carbonate
(2) polyethylene oxide, MW=600,000
(3) polyethylene glycol, MW=400
(4) polyethylene glycol diacrylate, MW=600
(5) trimethylolpropane triacrylate
(6) tetrabutyl ammonium tetrafluoroborate
(7) Darocure #1173, photoinitiator (available from EM Industries, Inc.)

EXAMPLE 1

1 cc of formulation 2 was coated on a sheet of smooth, non-absorbant paper at a coating thickness of about 10-20 microns. The coated paper was exposed to UV radiation from a UV lamp providing 125 watts/linear inch at 10 ft./minute. The resulting polymerized/crosslinked coating was an adherent but flexible film with good abrasion resistance. A solution of 10% by weight of H-83, a red leuco dye available from Hodagaya, in tetrahydrofurn (THF) was applied to the surface of the electrolyte at a coat weight of about 0.1 to 0.2 mg of dye/Cm$^2$ using a Meyer Rod #19. The resulting dye coating had a thickness of about 18 microns. Side by side electrodes were used to print an image by contacting the medium on one side only. An image was formed when a voltage as low as 1 volt was applied.

EXAMPLE 2

Example 1 was repeated except that an aluminized mylar film was employed as the substrate. The aluminum layer of the film acted as the negative pole and a stylus was used as the positive electrode. An image was formed when a voltage as low as 1 volt was applied. The image layer was removed from the substrate and transferred to a sheet of paper by lamination.

EXAMPLE 3

A sheet of porous xerographic paper was coated on both sides with formulation 1 which was less viscous than formulation 2. The front side of the thus coated paper was overcoated with the dye/THF solution at a coat weight of about 0.1 to 0.2 mg/Cm$^2$ as in Example 1. A negative electrode was applied to the back surface while a positive electrode was applied to the front surface. An image formed when a voltage as low as 1 volt was applied.

EXAMPLE 4

Example 1 was repeated except that the dye overcoat contained 2 leuco dyes, one of which was S-205 (black) available from Yamada and the other was H-83 (red) available from Hodagaya. The red dye developed at low voltage producing an image when the voltage was between 1 and 3.5 volts. A black image was produced when the voltage applied was is greater than 5 volts. At high voltage, i.e., about 10 to 100 volts both the red and black dyes were developed. The dye formulation which contained the black dye and red dye in a ratio of about 3 to 1 was such that the black dye masked the red color.

EXAMPLE 5

Example 1 is repeated except that the dye overcoat contains 2,3,5,7-tetrakis (3,5-di-tert-butyl-4-hydroxyphenyl) thieno [3,2-b] thiophene (THPT2) which is a compound having three stable oxidation states, each of which provides for a different color being formed depending upon the voltage applied. In the ground state, THPT2 is almost colorless having a slight yellow tint. When sufficient oxidation potential of about 1 to 5 volts is applied to the THPT2, a first oxidation stage is reached where the THPT2 exhibits a black color. A subsequent increase in voltage of 5 to 10 volts causes a second oxidation stage to be reached where the THPT2 exhibits a red color. A multiple color image is formed with a single leuco-dye by selecting proper voltage.

EXAMPLE 6

Example 5 is repeated except that leuco dye S-205 (black) is added in addition to the THPT2. Color images from colorless to blue to red to black are produced by selecting the proper voltage.

EXAMPLE 7

Example 3 is repeated except that 20% by weight of Optiwhite clay available from Burgess Pigment Co. was added to increase opacity of the media.

Having described the invention in detail and by reference to preferred embodiments thereof, it will be apparent that modifications and variations are possible without departing from the scope of the invention defined in the appended claims.

What is claimed is:

1. An electrochromic printing medium comprising a support having an electrochromic composition coated thereon, said composition comprising an electrolyte and a leuco dye, wherein said electrolyte is a two-phase interpenetrating network comprising a solid polymeric supporting matrix and a liquid interpenetrating conductive phase.

2. The electrochromic printing medium of claim 1 wherein said electrolyte is coated on said support as a first layer and said leuco dye is coated on said support as a second layer, said leuco dye overcoating said electrolyte.

3. The electrochromic printing medium of claim 2 wherein said polymer supporting matrix is derived from a radiation polymerizable monomer or prepolymer represented by one of the formula (I) to (III)

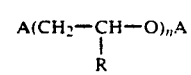   I

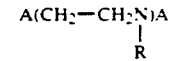   II

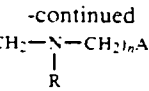

where n is about 3 to 50, R is hydrogen or an alkyl group having 1 to 4 carbon atoms, and A represents an ethylenically unsaturated moiety or a glycidyl moiety.

4. The electrochromic printing medium of claim 1 said leuco dye is selected from the group consisting of phthalides, fluorans, indolinobenzospiropyrans, phenothiazines, phthalazinones, phthalimidines, pyridopyridazones, and pyrrolopyridinones, anilines, and pyrroles.

5. The electrochromic printing medium of claim 4 wherein said leuco dye is ortho-sulfo benzoyl leuco methylene blue.

6. The electrochromic printing medium of claim 3 wherein said radiation polymerizable compound is polyethylene glycol diacrylate, polyethylene glycol dimethacrylate, an acrylate functionalized polyurethane, or polyethylene glycol diglycidyl ether.

7. The electrochromic printing medium of claim 1 wherein said interpenetrating conductive phase includes a salt of a cation selected from the group consisting of lithium, sodium, potassium, cesium, and ammonium cations; and an anion selected from the group consisting of I—, Br—, SCN—ClO$_4$—, CF$_3$SO$_3$—, BF$_4$—, PF$_6$—, AsF$_6$—, and CF$_3$COO—.

8. The electrochromic printing medium of claim 7 wherein said interpenetrating conductive phase comprises a radiation-inert ionically conducting polar aprotic compound or a compound having heteroatoms capable of forming donor-acceptor bonds with said alkali metal or ammonium cations.

9. The electrochromic printing medium of claim 8 wherein said radiation-inert ionically conducting liquid is selected from the group consisting of propylene carbonate, ethylene carbonate, gamma-butyrolactone, 1,3-dioxalane, 2-methyltetrahydrofuran, tetrahydrofuran, polyethylene glycol dimethyl ether, acetonitrile, tetraglyme, hexaglyme, and heptaglyme.

10. The electrochromic printing medium of claim 9 wherein said radiation-inert ionically conducting liquid is present in said electrolyte in an amount of about 20 to 50% and said radiation polymerizable polyethylenically unsaturated compound is present in an amount of about 20 to 55% based on the total weight of the radiation polymerizable material and the radiation inert ionically conducting liquid.

11. The electrochromic printing medium of claim 2 wherein said electrolyte is present on the front surface and the back surface of said support and said leuco dye is overcoated on one of said front surface or back surface.

12. A method for preparing an electrochromic printing medium for use in electrochromic printing which comprises applying to a surface of a support (1) an electrolyte, said electrolyte comprising a radiation polymerizable or crosslinkable unsaturated compound, a radiation-inert ionically conducting liquid, said ionically conducting liquid being an aprotic polar compound, and an ionizable alkali metal or ammonium salt; and (2) a leuco dye; and subjecting said medium to actinic radiation to thereby polymerize or crosslink said radiation polymerizable or crosslinkable compound.

13. The method of claim 12 comprising the steps of:
(1) applying said electrolyte to at least one surface of said support,
(2) subjecting said electrolyte to actinic radiation to polymerize or crosslink said polymerizable or crosslinkable compound,
(3) applying said leuco dye on one of said electrolyte-coated surfaces of said support, and
(4) drying said electrochromic printing medium.

14. A method for electrochromic printing which comprises applying an image forming voltage across an electrochromic printable medium in a predetermined pattern to form an image, said electrochromic printable medium comprising a support having coated on the surface thereof an electrochromic film composition comprising an electrolyte and a leuco dye, said electrolye comprising a two-phase interpenetrating network of a solid polymeric supporting matrix and a liquid interpenetrating conductive phase.

15. The method of claim 14 wherein said electrolyte and said leuco dye are present in said electrochromic composition as separate layers on said support, the first layer being said electrolyte and the second layer being said leuco dye, said leuco dye layer overcoating said electrolyte coated surface.

16. The method of claim 15 wherein said electrochromic film composition is removed from said substrate and transferred to a second substrate.

17. The method of claim 16 wherein said second substrate is plain paper.

18. The method of claim 16 wherein two or more individual electrochromic film compositions having different color images are overlaid with registration to provide a laminated multicolor imaging system.

19. The method of claim 14 wherein said voltage is about ±10 volts.

20. The method of claim 19 wherein said voltage is about ±5 volts.

* * * * *